Patented July 16, 1929.

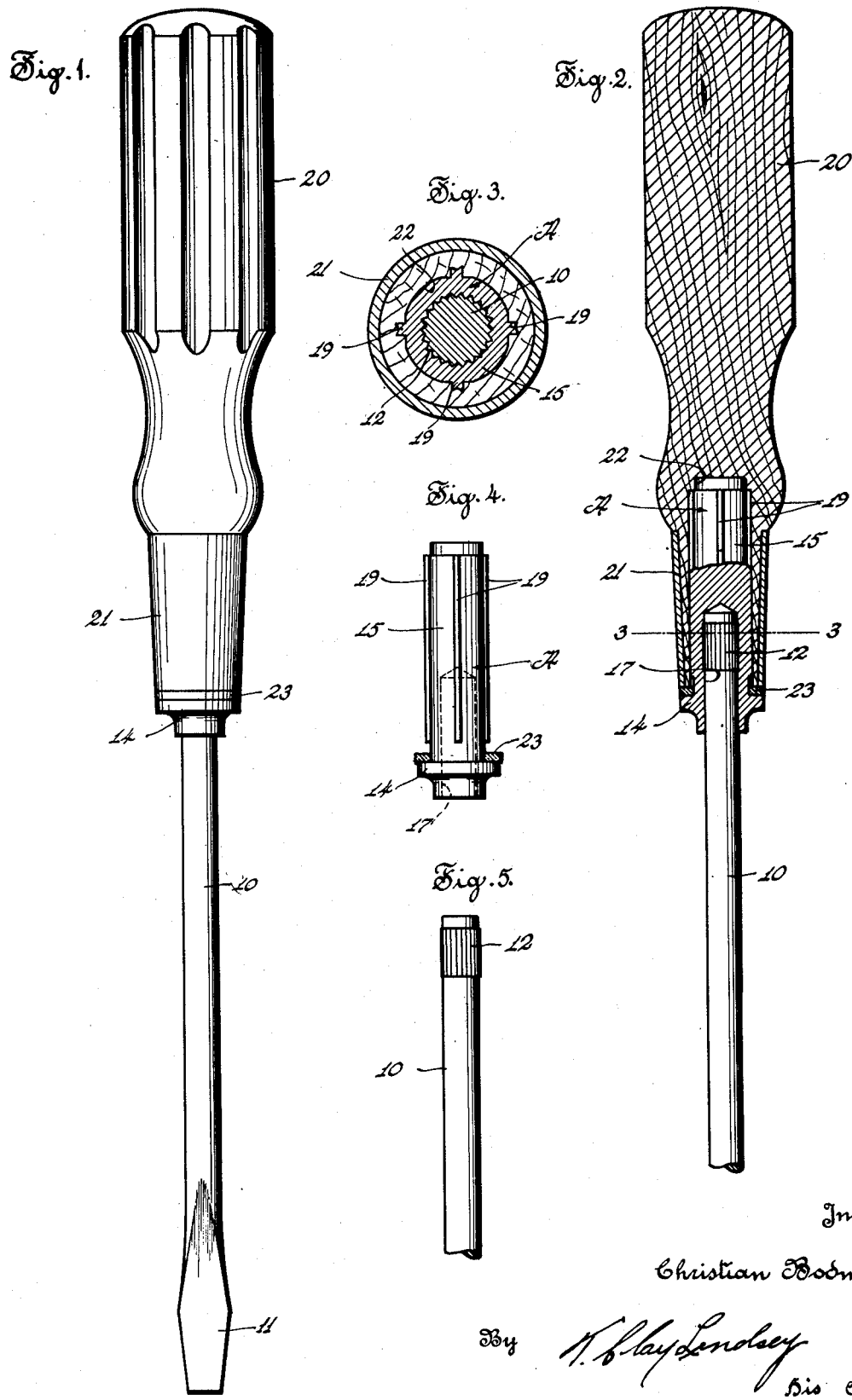

1,721,065

UNITED STATES PATENT OFFICE.

CHRISTIAN BODMER, OF NEW BRITAIN, CONNECTICUT, ASSIGNOR TO THE STANLEY WORKS, OF NEW BRITAIN, CONNECTICUT, A CORPORATION OF CONNECTICUT.

HAND TOOL.

Application filed February 10, 1927. Serial No. 167,245.

This invention relates to improvements in hand tools. In the present illustrative disclosure, I have shown my improvements incorporated in a screw driver to which use they are peculiarly adapted, but it is to be understood that this disclosure is by way of illustration only and the invention is adapted for use in tools of other kinds than that shown.

An aim of the present invention is to provide an improved hand tool, such as a screw driver, which is very durable and strong in that it will stand up under severe usage and abuse without likelihood of the handle cracking or the parts becoming separated or loose.

A further object of the invention is to provide a superior tool of this sort at a relatively low cost.

A still further aim of the invention is to provide a hand tool, such as a screw driver, which is particularly adapted for use in electrical work, the ferrule, which reinforces the forward end of the handle, being insulated from the blade.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claim.

In the accompanying drawings, wherein I have shown, for illustrative purposes, one of the embodiments which the present invention may take:

Figure 1 is an elevational view of my improved screw driver;

Fig. 2 is a longitudinal sectional view through the handle thereof;

Fig. 3 is a cross sectional view taken substantially on line 3—3 of Fig. 2;

Fig. 4 is an elevational view of the member which forms the bolster and the stem to which the handle is secured; and Fig. 5 is a view of the shank.

Referring to the drawings in detail, my improved tool has a shank portion 10 with a blade 11 formed on one end thereof. Adjacent its opposite end, the shank is provided with longitudinally extending corrugations or teeth 12 which are preferably formed by a process of knurling. By thus knurling the portion 12 of the shank, the original cross sectional area and strength of the shank at that point are retained while, at the same time, longitudinal teeth or fins are provided which constitute means for securing the shank to the stem, as hereinafter described.

The screw driver further has a member A which constitutes an integral bolster 14 and a stem 15. The bolstered end of this member has a bore 17 which is of the same diameter as that of the shank so that the shank fits closely therein. The stem 15 has longitudinally extending fins or ribs 19 which are preferably formed by putting the stem between suitable dies and bringing the dies together to thus squeeze out portions from the sides of the stem.

The numeral 20 designates a handle of wood or other suitable material, and this handle has, at its forward end, a ferrule 21. This end of the handle further has a bore or hole 22 which is substantially of the same diameter as that of the stem. The forward or smaller end of the ferrule 21 has an internal diameter greater than the over-all diameter of the stem so that, when the stem is driven into the bore 22 of the handle, the fins 19 are spaced from the ferrule, thus eliminating any electrical connection therebetween.

My improved screw driver is constructed by forming the blade and then knurling the portion 12 so as to provide the corrugations or teeth illustrated. The blade is then hardened and thereafter it is driven into the bore 17 of the stem with the result that the teeth 12 cut grooves in and embed themselves in the wall of the bore, thus locking the parts very securely against movement, relative to one another. It is found that, by thus joining the parts, not only is the blade very securely held against turning with respect to the stem, but there is no possibility of the blade becoming loose or moving longitudinally with respect to the stem.

Positioned around the stem and abutting against the shoulder provided by the bolster is preferably an insulating washer 23. This washer may be placed upon the stem before the fins 19 are formed thereon. The stem is driven into the bore 22 of the handle, this bore being of such diameter that the stem fits closely therein and the fins embed themselves in the wall of the bore. It will be noted that the internal diameter of the ferrule is such that the ferrule is spaced from the fins and the washer 23 insulates the ferrule from the bolster so that there is no electrical connection between the ferrule and the member A.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

I claim as my invention:

In a hand tool and in combination, a handle having a forward tapered end provided with a bore hole, a metallic member having a bolster at its forward end and an integral stem of substantially the same diameter as said hole, said stem having flat faced longitudinally extending fins driven into and embedded in the walls of said hole whereby said stem is securely anchored in said hole, said member having a central closed end bore at its forward end extending through said bolster and into said stem, a tool shank having adjacent its rear end raised longitudinally extending fins driven into and embedded in the wall of said bore of said member whereby said shank and member are securely interlocked, a ferrule fitting about the forward tapered end of said handle, and an insulating washer seated between the forward ends of said handle and ferrule and the opposing face of said bolster whereby said ferrule is insulated from said member.

CHRISTIAN BODMER.